(12) United States Patent
Beij et al.

(10) Patent No.: US 10,588,190 B2
(45) Date of Patent: Mar. 10, 2020

(54) LED LIGHTING ARRANGEMENT

(71) Applicant: SIGNIFY HOLDING B.V., Eindhoven (NL)

(72) Inventors: Marcel Beij, Sint Oedenrode (NL); Bertrand Johan Edward Hontele, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/739,842

(22) PCT Filed: Jun. 13, 2016

(86) PCT No.: PCT/EP2016/063501
§ 371 (c)(1),
(2) Date: Dec. 26, 2017

(87) PCT Pub. No.: WO2016/207009
PCT Pub. Date: Dec. 29, 2016

(65) Prior Publication Data
US 2018/0376557 A1    Dec. 27, 2018

(30) Foreign Application Priority Data
Jun. 25, 2015    (EP) .................................... 15173900

(51) Int. Cl.
H05B 33/08    (2006.01)
(52) U.S. Cl.
CPC ..... *H05B 33/0848* (2013.01); *H05B 33/0812* (2013.01); *H05B 33/0815* (2013.01);
(Continued)

(58) Field of Classification Search
CPC ... G09G 2320/0233; G09G 2320/0633; G09G 2320/0666; G09G 2330/021;
(Continued)

(56) References Cited

U.S. PATENT DOCUMENTS

2009/0225020 A1*  9/2009  Ran ..................... G09G 3/3406
                                                345/102
2011/0175550 A1*  7/2011  Lin ..................... H05B 33/0827
                                                315/297
(Continued)

FOREIGN PATENT DOCUMENTS

CN    104066247 A    9/2014
CN    104159367 A    11/2014
(Continued)

*Primary Examiner* — Tung X Le
*Assistant Examiner* — Borna Alaeddini
(74) *Attorney, Agent, or Firm* — Akarsh P. Belagodu

(57) ABSTRACT

The invention describes an LED lighting arrangement (1) comprising an LED load (10) comprising a number of LEDs (100); input terminals (14hi, 14lo) for connection to a power supply (2) realised to provide an input voltage (UPS) at a primary input voltage level (VPS); a voltage boost module (11) realised to boost the input voltage (UPS) to a level above the primary input voltage level (VPS) on the basis of a dim level input signal (30); and a dimming module (12) realised to decrease the LED current (ILED) through the LED load (10) when the boosted voltage (Uboost) exceeds the primary input voltage level (VPS). The invention further describes a method of driving an LED lighting arrangement (1).

15 Claims, 4 Drawing Sheets

(52) U.S. Cl.
CPC ....... *H05B 33/0845* (2013.01); *H05B 33/083* (2013.01); *Y02B 20/343* (2013.01); *Y02B 20/383* (2013.01)

(58) Field of Classification Search
CPC ................ G09G 3/3413; G09G 3/342; G09G 2310/024; G09G 2330/025; G09G 2330/028; G09G 3/3208; G09G 3/3283; G09G 3/3406; H05B 33/0815; H05B 33/0827; H05B 33/0812; H05B 33/086; H05B 37/02; H05B 33/083; H05B 33/0872; H05B 33/0809; H05B 33/0845; H05B 33/0851; H05B 33/0884; H05B 33/089; H05B 33/0818; H05B 33/0821; H05B 33/0824; H05B 33/0842; H05B 33/0848; H05B 33/0857; H05B 33/0863; H05B 33/0869; H05B 33/0887; H05B 37/0263

See application file for complete search history.

(56) References Cited

U.S. PATENT DOCUMENTS

| | | |
|---|---|---|
| 2013/0175944 A1 | 7/2013 | Campbell et al. |
| 2013/0249611 A1* | 9/2013 | Vandepas ................ H03L 1/022 327/159 |
| 2014/0062317 A1* | 3/2014 | Lee ....................... H05B 33/083 315/185 R |
| 2014/0265844 A1* | 9/2014 | Sadwick ............ H05B 33/0815 315/85 |
| 2015/0108919 A1* | 4/2015 | Van Erp ............. H05B 33/0812 315/294 |
| 2015/0237689 A1* | 8/2015 | Yang ................. H05B 33/0809 315/200 R |

FOREIGN PATENT DOCUMENTS

| | | |
|---|---|---|
| WO | 2013173284 A1 | 11/2013 |
| WO | 2015062938 A2 | 5/2015 |

* cited by examiner

LED LIGHTING ARRANGEMENT

CROSS-REFERENCE TO PRIOR APPLICATIONS

This application is the U.S. National Phase application under 35 U.S.C. § 371 of International Application No. PCT/EP2016/063501, filed on Jun. 13, 2016, which claims the benefit of European Patent Application No. 15173900.0, filed on Jun. 25, 2015. These applications are hereby incorporated by reference herein.

FIELD OF THE INVENTION

The invention describes an LED lighting arrangement, and a method of driving an LED lighting arrangement.

BACKGROUND OF THE INVENTION

LEDs are becoming more widely used as light sources, and are attractive owing to their long lifetime and low power consumption. A number of LEDs—along with a driving circuit—can be incorporated in a "retrofit" light bulb to replace a less energy-efficient light source, for example an incandescent light bulb. An incandescent lamp can be driven directly from an AC mains voltage, for example 240 V. A halogen lamp is generally driven from a transformer which provides a constant DC input voltage, for example 12 V or 24 V. Conventional lamps can be dimmed using various techniques such as phase-cut dimming. For example, the incandescent lamp(s) of a lighting fixture can be dimmed by means of a phase-cut dimmer integrated into a wall-mounted switch for that lighting fixture. Similarly, a power supply for a halogen light source can incorporate a transformer as well as a dimmer.

There are various ways of ensuring that an LED retrofit lamp can be used with existing lighting fixtures. For example, an LED driver can be realised to convert a phase-cut mains AC input to corresponding DC signals for its LED load. However, such drivers can be very complex and can significantly add to the cost of the lamp.

Therefore, it is an object of the invention to provide an alternative way of dimming the LEDs of a lighting arrangement.

SUMMARY OF THE INVENTION

The object of the invention is achieved by the LED lighting arrangement of claim 1; and by the method of claim 13 of driving an LED lighting arrangement.

According to the invention, the LED lighting arrangement comprises an LED load with a number of LEDs; input terminals for connection to a power supply realised to provide a primary input voltage to the lighting arrangement; a voltage boost module realised to boost the primary input voltage to a level above the nominal operating voltage on the basis of a dim level input signal; and a dimming module realised to decrease the current through the LEDs (i.e. the "LED current") when the boosted input voltage exceeds the primary input voltage level.

An LED load can comprise one or more LED light sources, e.g. one or more LED semiconductors mounted in any suitable configuration on a circuit board. In the context of the invention, the expression "primary input voltage level" is to be understood as the rated or nominal voltage of the LED load, i.e. the maximum voltage that should be applied across the LED load. For example, an LED may have a forward voltage of about 3.0 V. The nominal voltage of an LED load comprising three such LEDs will be 9 V. The power supply should provide 9 V—the "primary input voltage level"—as well as a certain overhead, as will be explained below. In the context of the invention, the power supply may be assumed to be a DC power supply realised to provide a constant DC voltage at the input terminals of the LED lighting arrangement.

An advantage of the LED lighting arrangement according to the invention is that a dimming function can be provided for the LED load with relatively little effort. The LED lighting arrangement can be connected directly to any suitable DC power supply, and also to an already existing dimmer by means of the dim level input signal. Furthermore, as will be explained below, the dimming module can be realised to always ensure that the LED current does not exceed a drive level, thus protecting the LEDs from thermal damage. Therefore, the LED lighting arrangement according to the invention presents an attractive alternative for low-voltage replacement or "retro-fit" lamps such as MR 16 lamps in conjunction with an existing dimming regulator of the lighting fixture. A retro-fit lamp must be compatible with the fixture with which it will be used, and LED lighting arrangement according to the invention can be realised to provide this compatibility, but with significantly less effort and cost than the known solutions. Another advantage of the LED lighting arrangement according to the invention is that the proposed circuitry can be realized in a very compact fashion, so that even miniature retro-fit lamps—such as candelabra lamps—are made possible. The inventive technique of down-regulating or decreasing the LED current in response to a boosted input voltage is referred to in the following as "reverse voltage dimming". Therefore, the LED lighting arrangement according to the invention can be realised to support a dimming function without any undesirable electromagnetic interference (EMI) or the audible humming associated with pulse-width modulation (PWM) dimming circuitry.

According to the invention, the method of driving an LED lighting arrangement comprises the steps of connecting the LED lighting arrangement to a power supply realised to provide a primary input voltage to the lighting arrangement, which has one or more LEDs as lighting load; connecting a dim level input signal to the LED lighting arrangement to indicate a dim level; boosting the primary input voltage to a level above the nominal operating voltage on the basis of the dim level input signal; and decreasing a current through the LEDs of the lighting load when the boosted input voltage exceeds the primary input voltage level.

An advantage of the method according to the invention is that it allows an LED lighting arrangement to be connected to an existing DC power supply and an existing dimmer, and allows the LEDs to be dimmed in a very straightforward manner. Regardless of the type of dimmer being used, the reverse-voltage dimming method according to the invention allows the current through the LEDs to be regulated in a very straightforward manner to achieve the desired light output level.

The dependent claims and the following description disclose particularly advantageous embodiments and features of the invention. Features of the embodiments may be combined as appropriate. Features described in the context of one claim category can apply equally to another claim category.

An input dimming signal can be interpreted as appropriate for use as a control signal to achieve a corresponding boosted voltage. For example, a dimmer might operate on the basis of a potentiometer that delivers a dim level input signal in the form of a voltage in a range between a low voltage and a high voltage, corresponding to a dim range between a low dim setting and a high dim setting. In a preferred embodiment of the invention, the LED lighting arrangement comprises an interface circuit for converting the dim level input signal into a control signal of the voltage boost module. In the following, it may be assumed that full light output corresponds to a 0% dim level, while zero light output corresponds to a 100% dim level. Full light output is achieved when the LED current is at its nominal drive level; zero light output is achieved when the LED current is reduced to a level at which the LEDs are effectively "off". The method according to the invention differs from comparable known dimming methods in that an increased input voltage results in a decreased light output; and a decreased input voltage results in an increased light output.

The voltage boost module can comprise any circuitry that is capable of converting an input voltage to a higher output voltage. For example, the input voltage could be boosted using any one of various switched-mode topologies such as boost, flyback, single-ended primary inductance converter, etc. The input voltage can be applied across input pins (a positive input pin and a negative input pin) of the voltage boost module, and the higher output voltage can be provided at output pins (one positive output pin and one negative output pin) of the voltage boost module.

In a particularly preferred embodiment of the invention, the voltage boost module comprises a boost converter. In such a realisation, the interface circuit can convert the dim level input signal to a switch control signal for controlling a switch of the boost converter. For example, a switch control signal, derived from the dim level input signal, can set the duty cycle of the switch of the boost converter. In such a realisation, the voltage boost module is active only during dimming, and remains inoperative when the LED load is driven at full power (100% light output). An advantage of this realisation is that a relatively cheap off-the-shelf or standard power supply can be used.

Preferably, the voltage boost module is realised to boost the primary input voltage in direct proportion to an increase in dim level, i.e. the boosted voltage increases as the dim level increases (i.e. with decreasing desired light output level). In one preferred embodiment of the invention, the voltage boost module is realised to boost the primary input voltage to a maximum boost level for a dim level input signal corresponding to a maximum dim level. In other words, a dim level of 100% (zero light output) results in a voltage increase to the maximum boost level, so that the voltage boost module will not apply a voltage higher than this maximum boost level to the dimming module. The voltage from the power supply can therefore be increased over a "boost range" from the primary input voltage level to the maximum boost level. In a particularly preferred embodiment of the invention, the voltage boost module is realised to boost the primary input voltage over a range of 3 V. For example, an off-the-shelf DC power supply can provide 12 V at its outputs. The LED load of a lighting arrangement according to the invention may comprise 4 LEDs, each with a nominal voltage of 3 V. The voltage boost module provides a voltage increase of up to 3 V to the dimming module, which in turn responds to the difference between the boosted voltage level and the primary voltage level by decreasing the LED current by an amount that is proportional to that difference. For example, if there is only a small difference between the boosted voltage level and the primary voltage level, the LED current will only be decreased by a small amount (resulting in a correspondingly small decrease in light output); if there is only a large difference between the boosted voltage level and the primary voltage level, the LED current will be decreased to a corresponding degree (resulting in a significant decrease in light output). Preferably, the dimming module is realised to decrease the LED current to zero as the boosted input voltage approaches the maximum boost level, i.e. the light output is dimmed by 100%.

In a preferred embodiment of the invention, the dimming module is realised to maintain the LED current at a maximum or nominal drive level when the boosted input voltage does not exceed the primary input voltage level. The maximum or nominal drive level is therefore the highest value of LED current that will pass through the LEDs, corresponding to the current that would flow through the same LED load when driven directly from the same power supply. In other words, the voltage boost module boosts the input voltage by zero when the dim level input signal indicates 0% dimming (i.e. 100% light output) so that the dimming module remains "inactive" and the LED current remains at the nominal drive level.

An LED load will emit light when the voltage across the LED load exceeds a certain minimum. LED current is dependent on the voltage across the LEDs, and the light output essentially follows the LED current. Generally, the input voltage should not exceed a rated voltage level, since excessively high LED current ultimately decreases the lifetime of the LED. For these reasons, it is important that the LED current does not exceed a recommended drive level. This can be achieved in a number of ways. In one approach, the LED current can be controlled in a relatively straightforward manner using a semiconductor switch such as a bipolar junction transistor in series with the LED load, and by applying an appropriate voltage to the base of the BJT to regulate the amount of current passed by the switch. A current control circuit regulates the BJT base voltage to ensure that the LED current remains essentially constant for an input voltage up to the rated or nominal level. In a conventional circuit, when the input voltage exceeds the rated voltage, LED current remains constant, and the excess power is dissipated by the current control circuit.

Such a conventional control approach is associated with unfavourably high losses. In the LED lighting arrangement according to the invention, in contrast, a dimming module ensures that the LED current decreases as the input voltage rises above the primary or nominal voltage level. This can be done in a number of ways. For example, a microprocessor could be used to monitor the input voltage and to regulate the LED current according to the inventive "reverse-voltage dimming" principle. However, in a preferred embodiment of the invention, the dimming module comprises a current control circuit comprising a reference input and a variable input, and the current control circuit is realized to regulate LED current through the first semiconductor switch according to a difference between the reference input and the variable input. Furthermore, the dimming module comprises a voltage monitor circuit realized to generate the variable input to the current control circuit on the basis of the boosted input voltage. With this favourable realisation, an increase in voltage above the primary voltage level is detected, and the LED current is down-regulated in response to the higher input voltage. The current control circuit and the voltage monitor circuit can be designed using analogue components, allowing a favourably compact realisation. In this way, with relatively little effort and low cost, an LED lighting arrangement is possible which is compatible with existing circuitry, e.g. a lighting fixture incorporating a legacy high-frequency transformer for halogen lamps, a phase-cut dimmer, etc.

Preferably, the voltage monitor circuit is realized to raise the voltage level at the variable input to the current control circuit when the input voltage exceeds the primary input voltage level. This can be achieved using any appropriate circuitry. In a particularly preferred embodiment of the invention, the voltage monitor circuit comprises a programmable shunt regulator to fulfil this function. The programmable shunt regulator is preferably connected via its cathode to a positive output pin of the boost converter. A closed-loop feedback connection to a reference terminal of the shunt regulator and its anode is formed by a voltage divider. By appropriate choice of resistor values, the voltage divider can set the upper threshold level beyond which the current down-regulation should commence. In the following, the primary input voltage level may also be referred to as a "dim trigger level", since the LED current is reduced when the input voltage exceeds this level, with the result that the light output will be dimmed.

There are various possible ways of performing LED current control on the basis of a reference input and a control input . . . . However, in a particularly preferred embodiment of the invention, the current controller comprises a comparator realised to compare the variable input with the reference input, and wherein the gain of the comparator is controlled by the input voltage. For example, a single-supply op amp can be used, with its positive supply terminal connected to the positive output pin of the boost converter. The magnitude of the output signal of the op amp will depend on the difference between its inputs, and also on its gain which, in this configuration, is determined by the input voltage.

During "normal" operation of the LED lighting arrangement, the input voltage will not exceed the primary input voltage level. The variable input to the current controller will therefore deliver a measure of the current through the LEDs via the current sense resistor. In a preferred embodiment of the invention, the comparator will act under these circumstances to adjust the BJT base terminal voltage in order to keep the LED current at an essentially constant drive level. Once the input voltage exceeds the primary input voltage level or dim trigger level, the comparator will act to adjust the BJT base terminal voltage in order to reduce the LED current. For example, for an NPN transistor switch, reducing the base terminal voltage will reduce the current through the switch and therefore also the LED current.

The LED current can be regulated in any suitable fashion when the input voltage exceeds the dim trigger level. For example, the LED current could be reduced in a step-wise fashion as the input voltage increases above the dim trigger level. In a particularly preferred embodiment of the invention, the LED current is reduced in an essentially linear fashion as the input voltage is boosted above the dim trigger level. In this way, the LED current steadily decreases as the boosted voltage steadily increases.

Preferably, the current controller and voltage monitor are realized to result in the LED current decreasing to zero as the boosted input voltage approaches a maximum value. In other words, above a certain boosted voltage level, the LED load is dimmed completely and does not emit light.

The LED lighting arrangement according to the invention is preferably realised as a retrofit LED lamp, with a connector for insertion into a socket of a lighting fixture powered by a DC power supply. The connector can be any standard connector such as a bi-pin, bayonet, or threaded connector. For example, the LED lighting arrangement according to the invention can be realized as an MR 16 lamp with a GU 10 connector to replace a halogen lamp.

The power supply to the LED lighting arrangement according to the invention should provide the voltage to drive the LEDs, as well as sufficient voltage "headroom" for satisfactory current regulation. A dimming module of the LED lighting arrangement according to the invention can require about 0.5-1.0 V, and voltage losses in wiring and in any reverse polarity diodes should also be taken into account. Generally, an additional 3 V overhead or headroom should be provided.

The efficiency of the LED lighting arrangement according to the invention will depend to a large extent on the power supply and the number of LEDs used in the LED load. For example, with an off-the-shelf 24 V power supply and a string of six LEDs each with a 3.0 V forward voltage, 18.0 V (six times 3.0 V) of the supply can be effectively used for light output. The nominal or rated voltage of the LED load is the upper threshold level. Therefore, in the above example, the upper threshold level or dim trigger level is 18.0 V. The remaining overhead of 3.0 V can be used by dimming module to perform its current regulation. The efficiency of such a circuit is 75% (18 divided by 24).

With seven 3.0 V LEDs, the total LED voltage is 21.0 V (seven times 3.0 V). The efficiency in this case is a favourably high 87.5% (21 divided by 24). In this example, the upper threshold level or dim trigger level is 21.0 V.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
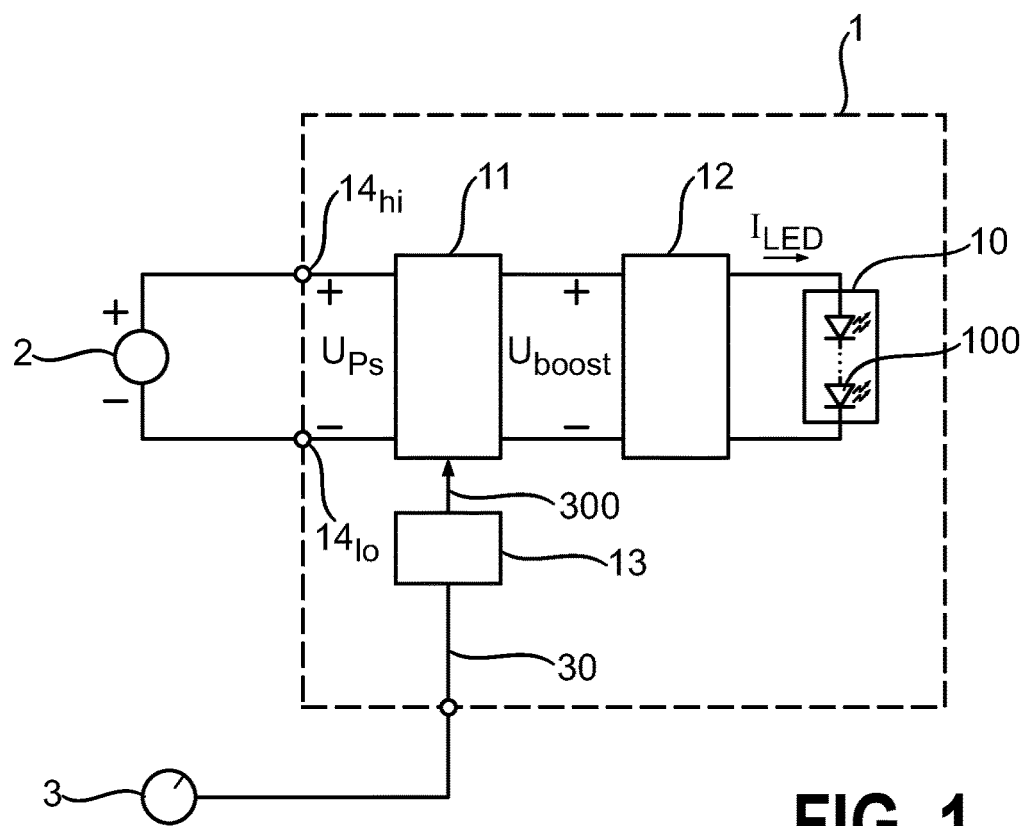
FIG. 1 is a schematic diagram of a first embodiment of the LED lighting arrangement according to a the invention.

FIG. 1 is a block diagram of an embodiment of the LED lighting arrangement 1 according to the invention. The diagram shows the LED lighting arrangement 1 connected to a DC power supply 2 which supplies a DC voltage $U_{PS}$ at a fixed or primary voltage level. Output terminals of the power supply 2 are connected to input terminals $14_{hi}$, $14_{lo}$, of the LED lighting arrangement 1. The LED lighting arrangement 1 comprises an LED lighting load 10, which in this case consists of a string or series arrangement of power LEDs 100. The LEDs preferably all have the same nominal or rated voltage. As already described above, the LEDs 100 will emit 100% light output when connected across a sufficiently high voltage, i.e. at least n times the nominal LED voltage for a string of n LEDs 100. In this embodiment, it is assumed that the DC voltage $U_{PS}$ applied at the input terminals $14_{hi}$, $14_{lo}$ of the LED lighting arrangement 1 is high enough to achieve 100% light output and also provides an additional few volts overhead for current regulation.

The LED lighting arrangement 1 comprises a boost converter 11, which is realised to boost the input voltage $U_{PS}$ to a level above the primary input voltage level according to a dim level input signal 30, and a dimming module 12 realised to decrease the LED current $I_{LED}$ through the LED load 10 when the boosted voltage $U_{boost}$ exceeds the primary input voltage level.

Figure 2:
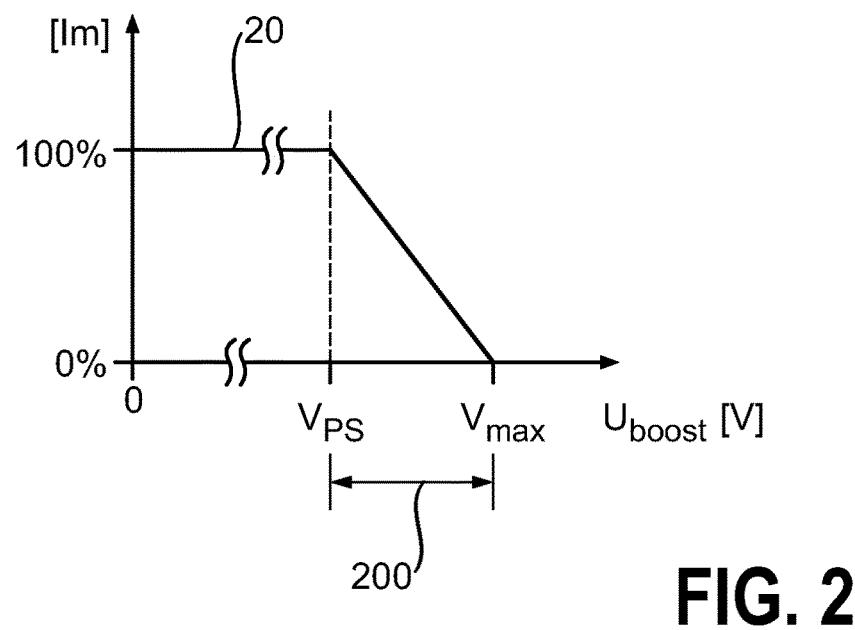
FIG. 2 shows a graph illustrating the operation of the LED lighting arrangement according to the invention.

The principle of operation of the LED lighting arrangement 1 is shown in FIG. 2. Here, a graph 20 shows the light output [%] against the voltage $U_{boost}$ applied to the dimming module 12. Up to the primary input voltage level $V_{PS}$, the light output is at 100%, or full light output. When the voltage $U_{boost}$ applied to the dimming module 12 increases above the primary input voltage level $V_{PS}$, the light output starts to decrease. As the voltage $U_{boost}$ applied to the dimming module 12 approaches a maximum $V_{max}$, the light output approaches zero. In other words, to decrease the light output of the LED load, the voltage $U_{boost}$ applied to the dimming module 12 is increased. This is the "reverse-voltage dimming" principle of the invention.

The boost converter 11 and the dimming module 12 are preferably realised to match each other in performance, e.g. so that the boost converter 11 is realised to increase the voltage over a certain span 200 or range 200, and the dimming module 12 (which is driven from an output terminal of the boost converter 11) is realised to decrease the LED current $I_{LED}$ over the complete dimming range from the drive level (100% light output) to off (0% light output).

Figure 3:
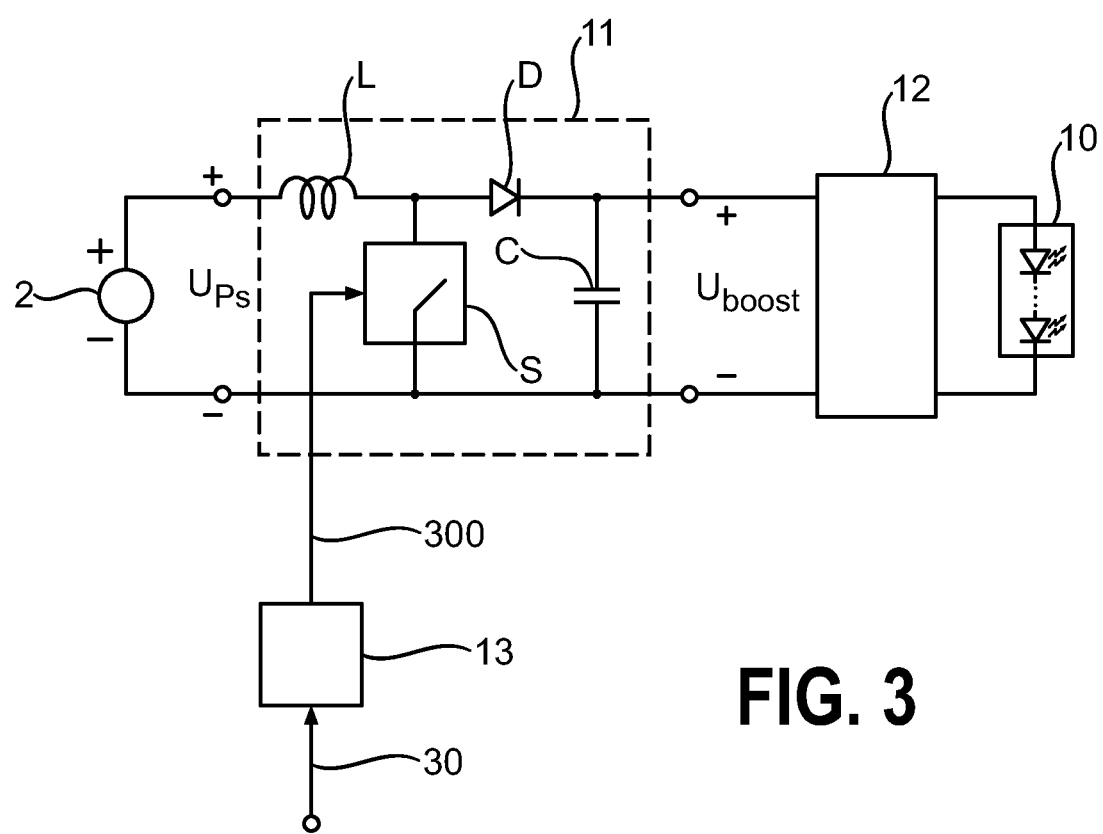
FIG. 3 is a schematic diagram of a second embodiment of the LED lighting arrangement according to a the invention.

In the exemplary embodiment shown in FIG. 1, a dim level converter 13 converts the dim level input signal 30 into a control signal 300 for the boost converter 11. One possible realisation is shown in FIG. 3. Here, the boost converter 11 comprises a well-known arrangement of inductor L, switch S, diode D, and capacitor C. The switch S is usually realised using a MOSFET, since this kind of transistor can be switched very rapidly. By controlling the rate at which the switch S is opened and closed (i.e. by controlling its duty cycle) during a continuous mode of operation of the boost converter 11, it is possible to set the level of the output voltage $U_{boost}$ which can be accumulated across the capacitor C. Preferably, a dim level converter 13 converts a dim setting (0% to 100%) to a duty cycle (0 to 1). At a duty cycle of 0, the output voltage $U_{boost}$ will essentially correspond to the primary input voltage level $V_{PS}$; at a duty cycle of 1, the output voltage $U_{boost}$ will be at the maximum level $V_{max}$.

Figure 4:
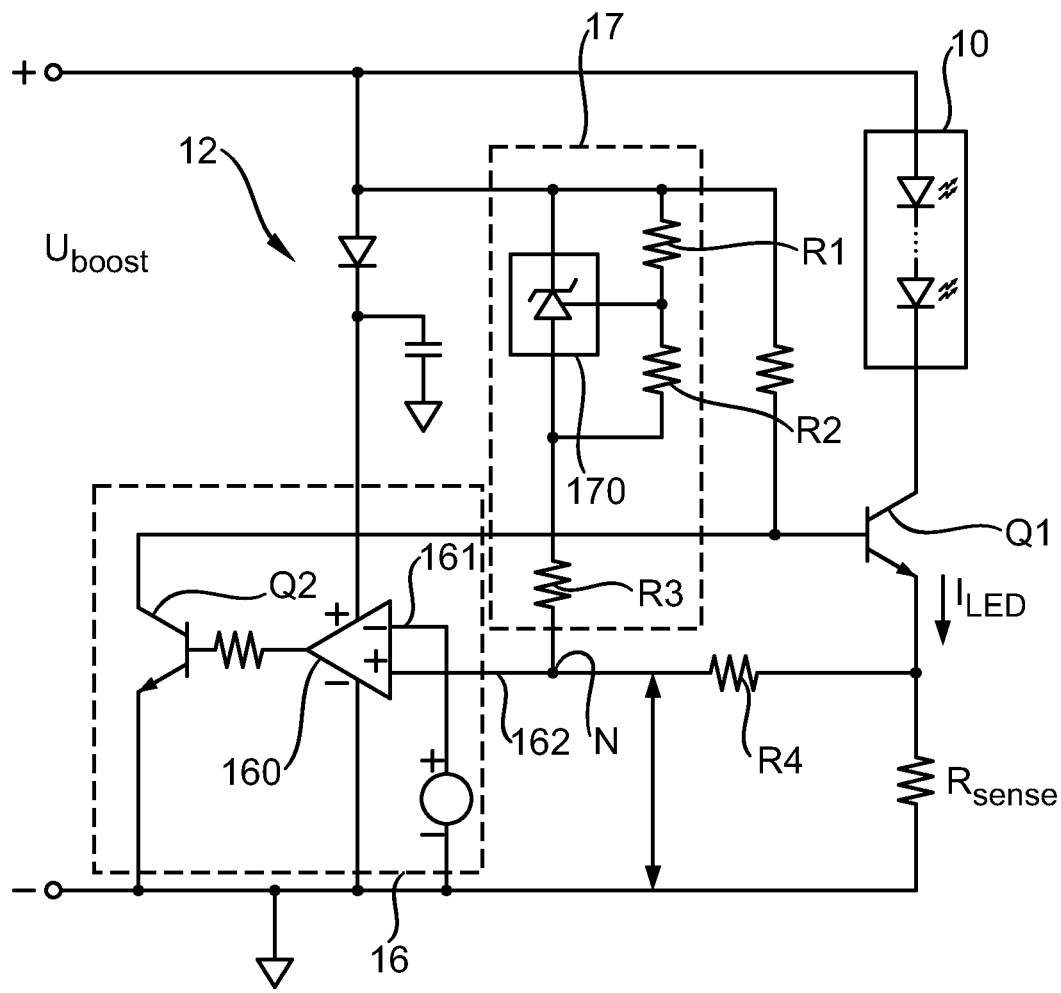
FIG. 4 shows a possible embodiment of the dimming module of an LED lighting arrangement according to the invention.

FIG. 4 is a circuit diagram showing a possible embodiment of the dimming module 12 of the LED lighting arrangement according to the invention. The dimming module 12 comprises a voltage monitoring circuit 17 and a current control circuit 16. The LED load 10 is connected in series with a first semiconductor switch Q1 and a current sense resistor $R_{sense}$. In this exemplary embodiment, the first semiconductor switch Q1 is an NPN BJT, and its base terminal is connected to the output of the current control circuit 16.

The current control circuit 16 comprises an operational amplifier 160 and a second semiconductor switch Q2. A reference input 161 of the operational amplifier 160 is connected to a constant voltage, i.e. a reference level (indicated by the voltage source symbol). The positive supply terminal of the operational amplifier 160 is connected to the positive output terminal of the boost converter, which is applying a boost input voltage $U_{boost}$ to the dimming module 12. The negative supply terminal of the operational amplifier 160 is connected to ground.

The size of the current sense resistor $R_{sense}$ determines the default or nominal LED drive current. The current sense resistor $R_{sense}$ assists in regulating the LED current $I_{LED}$ to the essentially constant drive level during normal operation of the lighting arrangement, i.e. when the boost input voltage $U_{boost}$ is not higher than the primary input voltage level $V_{PS}$. To this end, the current sense resistor $R_{sense}$ is connected via node N to a control input 162 of the current control circuit 16, i.e. to the variable input 162 of the operational amplifier 160.

The node N is also connected to the voltage monitor circuit 17, which is realized using a programmable shunt regulator 170. As long as the input voltage $U_{boost}$ is below a level set by a voltage divider arrangement R1, R2, the voltage at the node N (and therefore the "current control level" of the control input 162 to the op amp 160) will change only in response to an alteration in LED current $I_{LED}$. The operational amplifier 160 reacts to any slight difference between the voltages at the reference input 161 and the control input 162 by adjusting the base terminal voltage of the second transistor switch Q2, thereby indirectly adjusting the base terminal voltage of the first transistor switch Q1. Therefore, as long as the input voltage $U_{boost}$ is at the nominal level for that LED load 10, the LED current $I_{LED}$ will remain at an essentially constant drive level, and the light output will also remain essentially constant at 100%. The upper threshold level or dim trigger level is the nominal or rated voltage for the LED load 10.

The closed-loop behavior of the circuit comprising the current sense resistor $R_{sense}$, the operational amplifier 160 and the second transistor switch Q2 always tries to keep the voltage at the control input 162 equal to the voltage at the reference input 161 or "current control level". In other words, the closed-loop behavior acts to correct the voltage at the current control level to make it equal to the reference voltage. When the input voltage $U_{in}$ increases above the threshold voltage, the shunt regulator 170 of the voltage monitor circuit 17 will increase its passing current. This passing current will raise the voltage at node N, since it is creating an additional voltage drop (indicated by the arrow) across resistor R4 and current sense resistor $R_{sense}$. In other words, the shunt regulator 170 will pull the voltage at the control input 162 above the reference level. As a result, the current through the current sense resistor $R_{sense}$ must decrease to bring the voltage at the control input 162 back to the reference level.

The increased voltage at the control input 162 to the operational amplifier 160 increases the voltage at the base of the second transistor switch Q2, so that it sinks more current, thereby lowering the voltage at the base terminal of the first transistor switch Q1, and decreasing the LED current $I_{LED}$. The reduction in LED current $I_{LED}$ results in a decreased or dimmed light output. The current control circuit 16 effectively responds to a change in voltage drop between node N and ground, as indicated by the arrow, and strives to keep the voltages at the reference input 161 and the control input 162 at the same level.

Resistor R4 is chosen to be much larger than the current sense resistor $R_{sense}$ to ensure that a small current flowing through the shunt regulator 170 will create a large drop in LED current $I_{LED}$. In this way, the total current flow through the circuit will decrease. The process of decreasing LED current $I_{LED}$ as the input voltage increases will continue until the first transistor switch Q1 is effectively turned off, resulting in 0% light output (100% dimming). While the LED current is being down-regulated by the "reverse voltage dimming", the power dissipation of the first transistor Q1 will also decrease, and drops to 0 W when the LED current $I_{LED}$ reaches 0 mA. The dim trigger level, i.e. the level of input voltage $U_{in}$ at which the "dimming" of the LED load 10 commences, can be set by choosing appropriate values for the resistors R1, R2, R3, R4.

Figure 5:
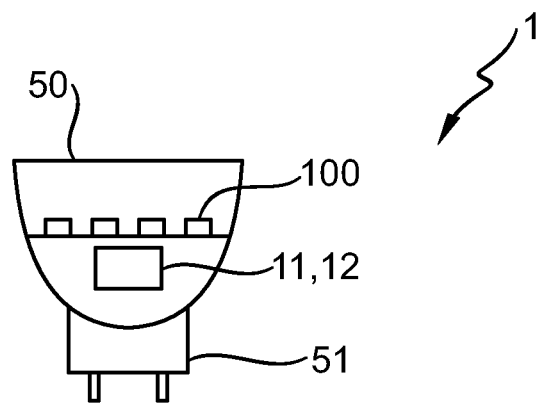
FIG. 5 is a schematic representation of the inventive LED lighting arrangement realized as a retrofit lamp.

FIG. 5 is a schematic representation of the LED lighting arrangement 1 according to the invention, realised as a retrofit lamp. Here, the LEDs 100 of the LED load are mounted in a reflector lamp housing 50. The control circuitry—the voltage boost module 11 and the dimmer module 12—of the LED lighting arrangement 1 is arranged as appropriate in the base of the housing 50. The retrofit lamp can have a suitable connector interface 51, shown in this example as a bi-pin connector 51. The control circuitry of the LED lighting arrangement 1 according to the invention can be very compact, so that retrofit miniature lamps are possible.

Figure 6:
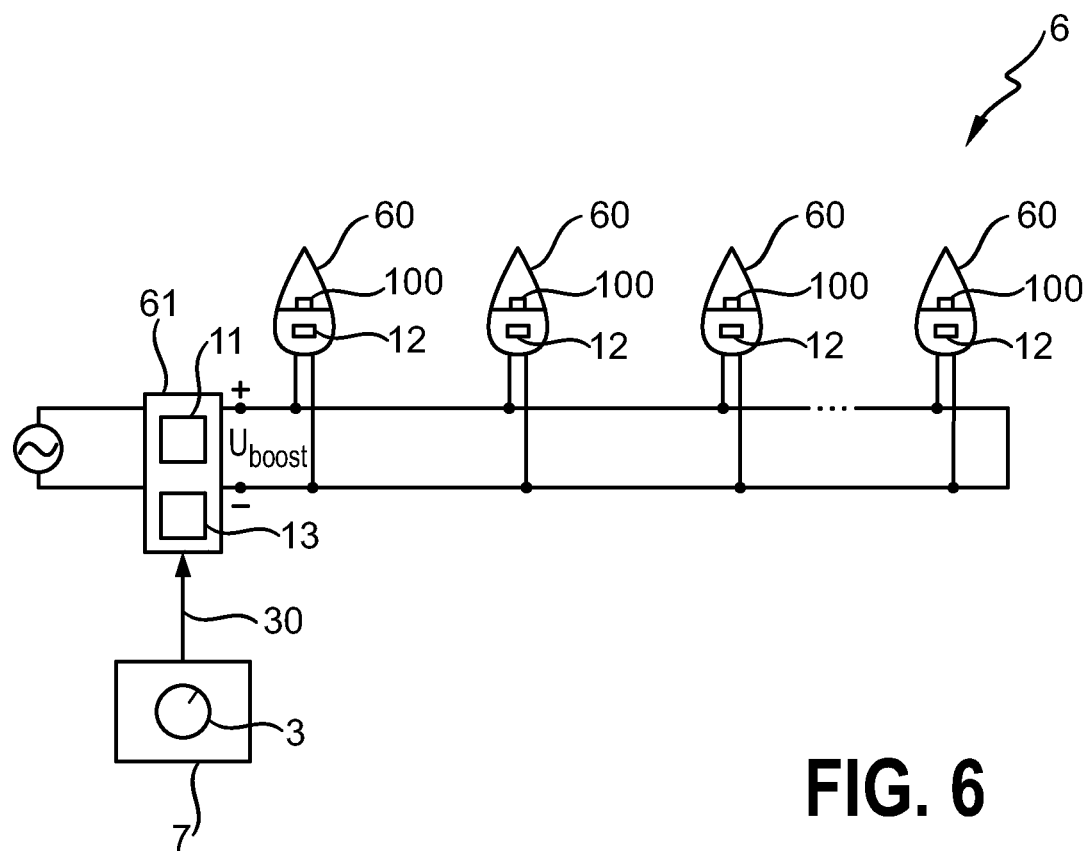
FIG. 6 is a schematic representation of third embodiment of the LED lighting arrangement according to the invention.

FIG. 6 is a schematic representation of a lighting fixture 6 comprising several retrofit candelabra light bulbs 60. Each retrofit candelabra lightbulb 60 can comprise a miniature housing 60 enclosing one or more LEDs 100 and control circuitry comprising a dimmer module 12 arranged in the base of the lamp housing 60. In this embodiment, a common boost converter 11 is arranged in a physically separate drive circuit 61, which is realised to convert an AC mains input to a suitable DC input, which in turn can be boosted to an output voltage $U_{boost}$ in response to a dim input 30 to the candelabra fixture 6. A dim signal converter 13 converts the dim input signal 30 to a switch control signal of the boost converter 11. The dim input signal 30 can be a wireless signal originating from a hand-held controller 7 such as a smartphone, etc. with a software "dimmer" 3 installed as a dimming app. The LED control technique described in the context of the invention can be highly miniaturized, particularly compared to the known mains voltage dimmable candelabra lamps. This miniature realization can result in a very appealing lamp design. In a further development, the power converter unit 61 can be located unobtrusively in a central location of the lighting fixture, for example in a suspension fixture of a chandelier.

Although the present invention has been disclosed in the form of preferred embodiments and variations thereon, it will be understood that numerous additional modifications and variations could be made thereto without departing from the scope of the invention. For example, the "reverse voltage dimming" principle could be used with a power supply that has a nominal output voltage above the "100% dimming" level described above, i.e. the power supply delivers a voltage that exceeds the sum of the LED voltage, the overhead and the control range—for seven 3 V LEDs, a 28 V power supply provides 21.0 V for the LEDs, 3.0 V for overhead and a few volts for current control. Full dimming (0% light output) could be at 27.0 V. To dim to a certain light level, the output voltage must be down-regulated (using a suitable voltage reduction circuit such as a buck converter, a flyback converter, etc.) For example, to dim down to 70%, the voltage might be down-regulated to about 25.0 V. Such an embodiment may require a non-standard power supply, which may add to the overall cost. The voltage reduction circuit would be active in the non-dimmed mode, adding to the power consumption.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An LED lighting arrangement comprising:
    an LED load comprising a number of LEDs;
    input terminals for connection to a power supply realised to provide an input voltage at a primary input voltage level;
    a voltage boost module realised to boost the input voltage to a level above the primary input voltage level on the basis of a dim level input signal; and
    a dimming module realised to decrease the LED current through the LED load when the boosted voltage exceeds the primary input voltage level.

2. The LED lighting arrangement according to claim 1, wherein the voltage boost module is realised to boost the input voltage in direct proportion to an increase in dim level.

3. The LED lighting arrangement according to claim 1, wherein the voltage boost module is realised to boost the input voltage to a maximum boost level for a dim level input signal corresponding to a maximum dim level.

4. The LED lighting arrangement according to claim 1, wherein the dimming module is realised to decrease the LED current to zero as the boosted input voltage approaches a maximum boost level.

5. The LED lighting arrangement according to claim 1, realised as a retrofit LED light bulb, with connectors for insertion into a socket of a lighting fixture powered by a DC power supply.

6. The LED lighting arrangement according to claim 1, wherein the voltage boost module is realised to boost the input voltage by up to 3 V.

7. The LED lighting arrangement according to claim 1, wherein the voltage boost module comprises a boost converter.

8. The LED lighting arrangement according to claim 1, comprising an interface circuit for converting the dim level input signal to a switch control signal for controlling a switch of the boost converter.

9. The LED lighting arrangement according to claim 1, wherein the LED load is arranged in series with a first semiconductor switch and a current sense resistor; and wherein the dimming module comprises
    a current control circuit comprising a reference input and a variable input, which current control circuit is realized to regulate LED current through the first semiconductor switch according to a difference between the reference input and the variable input; and
    a voltage monitor circuit realized to generate the variable input to the current control circuit on the basis of the boosted input voltage.

10. The LED lighting arrangement according to claim 9, wherein the voltage monitor circuit comprises a programmable shunt regulator.

11. The LED lighting arrangement according to claim 9, wherein the current control circuit comprises a comparator realised to compare the variable input with the reference input, and wherein the gain of the comparator is controlled by the boosted input voltage.

12. The LED lighting arrangement according to claim 11, wherein the comparator is connected to decrease the current through the first semiconductor switch when the boosted input voltage exceeds the primary input voltage level.

13. A method of driving an LED lighting arrangement that has an LED load comprising a number of LEDs, which method comprises the steps of:
- connecting the LED lighting arrangement to a power supply realised to provide an input voltage at a primary input voltage level;
- connecting a dim level input signal to the LED lighting arrangement to indicate a desired dim level;
- boosting the input voltage to a level above the primary input voltage level on the basis of the dim level input signal; and
- decreasing the LED current when the boosted input voltage exceeds the primary input voltage level.

14. The method according to claim 13, comprising the step of maintaining the LED current at a maximum drive level when the boosted input voltage does not exceed the primary input voltage level.

15. The method according to claim 13, comprising the step of reducing the LED current linearly as the boosted input voltage increases above the primary input voltage level.

* * * * *